United States Patent
Queseth et al.

(10) Patent No.: US 8,195,179 B2
(45) Date of Patent: Jun. 5, 2012

(54) NUMBERING OF RADIO FREQUENCY CHANNELS

(75) Inventors: Olav Queseth, Solna (SE); Muhammad Kazmi, Bromma (SE); Johan Skold, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 12/673,720

(22) PCT Filed: Mar. 25, 2008

(86) PCT No.: PCT/SE2008/050324
§ 371 (c)(1),
(2), (4) Date: Feb. 16, 2010

(87) PCT Pub. No.: WO2009/025608
PCT Pub. Date: Feb. 26, 2009

(65) Prior Publication Data
US 2011/0009123 A1    Jan. 13, 2011

(30) Foreign Application Priority Data
Aug. 17, 2007  (SE) ...................... 0701890

(51) Int. Cl.
*H04W 72/00* (2009.01)
(52) U.S. Cl. ...................................................... 455/450
(58) Field of Classification Search .................. 455/450, 455/331, 444, 63, 34.1, 54.1, 56.1, 62, 67.1, 455/422, 452, 451, 455, 454, 464, 509, 426, 455/434, 437, 513, 452.1, 452.2, 453, 515, 455/458, 101, 435.1, 562.1, 522; 370/280, 370/336, 331, 465, 462, 329, 458, 436, 335; 375/299, 260
See application file for complete search history.

(56) References Cited

U.S. PATENT DOCUMENTS

| | | | |
|---|---|---|---|
| 6,014,562 A * | 1/2000 | Weiss | 455/427 |
| 7,301,921 B2 * | 11/2007 | Heo | 370/329 |
| 7,796,639 B2 * | 9/2010 | Buckley et al. | 370/465 |
| 8,102,804 B2 * | 1/2012 | Noh et al. | 370/329 |
| 2008/0267317 A1 * | 10/2008 | Malladi | 375/299 |
| 2008/0268878 A1 * | 10/2008 | Wang et al. | 455/458 |
| 2008/0274759 A1 * | 11/2008 | Chen et al. | 455/507 |
| 2009/0046617 A1 * | 2/2009 | Tenny et al. | 370/312 |
| 2009/0047942 A1 * | 2/2009 | Cao | 455/422.1 |
| 2009/0086710 A1 * | 4/2009 | Ho | 370/349 |
| 2009/0092056 A1 * | 4/2009 | Kitazoe | 370/252 |
| 2009/0122736 A1 * | 5/2009 | Damnjanovic et al. | 370/311 |
| 2009/0129298 A1 * | 5/2009 | Luo et al. | 370/280 |
| 2009/0141646 A1 * | 6/2009 | Legg | 370/252 |
| 2010/0027501 A1 * | 2/2010 | Fukuoka et al. | 370/330 |
| 2010/0093386 A1 * | 4/2010 | Damnjanovic et al. | 455/522 |
| 2010/0265867 A1 * | 10/2010 | Becker et al. | 370/312 |
| 2010/0323736 A1 * | 12/2010 | Fischer et al. | 455/509 |

FOREIGN PATENT DOCUMENTS
WO    00/22851       4/2000
WO    02/056610 A2   7/2002
* cited by examiner

*Primary Examiner* — Melody Mehrpour
(74) *Attorney, Agent, or Firm* — Coats & Bennett, P.L.L.C.

(57) ABSTRACT

The present invention relates to a method and arrangements where each frequency channel is assigned a primary (global) number and a secondary (in-band) number. In accordance with embodiments of the present invention the primary number for one frequency channel (e.g. unicast downlink channel) and one or more secondary channel numbers to account for the corresponding unicast uplink and/or for one or more MBSFN channels are signalled. The primary (global) number indicates the band and frequency channel number while the secondary (in-band) number indicates the frequency channel within the relevant frequency band.

16 Claims, 4 Drawing Sheets

---

Assign a global number to a primary frequency of a first band. — 101

Assign an in-band number to a secondary frequency within the second frequency band. — 102

Assign a further in-band number to a further secondary frequency within the secondary frequency band. — 103

| Band | Downlink freq range | Global number | Uplink freq range | Secondary number |
|---|---|---|---|---|
| 1 | 2110 MHz - 2170 MHz | 0 – 599 | 1920 MHz - 1980 MHz | 0 – 599 |
| 2 | 1930 MHz - 1990 MHz | 600 – 1199 | 1850 MHz - 1910 MHz | 0 – 599 |
| 3 | 1805 MHz - 1880 MHz | 1200 – 1949 | 1710 MHz - 1785 MHz | 0 – 749 |
| 4 | 2110 MHz - 2155 MHz | 1950 – 2399 | 1710 MHz - 1755 MHz | 0 – 449 |

Fig. 3

NUMBERING OF RADIO FREQUENCY CHANNELS

TECHNICAL FIELD

The present invention relates to a method and arrangements in a cellular telecommunication system and in particular to numbering of radio frequency channels used in the wireless communication system.

BACKGROUND

In current wireless telecommunication systems such as GSM and UMTS Terrestrial Radio Access Network (UTRAN), the possible downlink frequencies are enumerated where each combination of operating frequency band and frequency is given a unique number called Absolute Radio Frequency Channel Number (ARFCN). The ARFCN is a function that maps a number, e.g. 42 to a frequency and to a band. For example 42 is mapped to band 1 and carrier frequency 2134.6 MHz by the ARFCN.

Since some bands are overlapping the same frequency may actually be assigned multiple numbers, one for each band.

In frequency division duplex (FDD) mode of operation used in UTRAN FDD, the uplink and downlink transmission take place on different carrier frequency channels, as described in 3GPP TS 25.101: "UE Radio transmission and reception (FDD)". The carrier frequency channel spacing in UTRAN FDD in each direction is 5 MHz. Therefore, in the FDD mode both uplink and downlink transmission can occur simultaneously in time.

On the other hand in time division duplex (TDD) mode used in UTRAN TDD, the uplink and downlink transmission take place on the same carrier frequency channel but in different time slots or time frames, as described in 3GPP TS 25.102: "UTRAN (UE) TDD; Radio transmission and reception". The carrier frequency channel spacing in UTRAN TDD is also 5 MHz.

The half duplex that is used in GSM can be regarded as a hybrid scheme where the uplink and downlink are transmitted on different carrier frequencies and on different time slots as described in 3GPP TS 05.05: "Radio Transmission and Reception". This means that uplink and downlink transmission do not occur simultaneously. The carrier frequency channel spacing in GSM is 200 KHz.

In any of the above schemes, in principle the base station may be utilizing more than one frequency channel to transmit and receive.

In one scenario the base station may provide only unicast services, which can use transmit and receive channels on different or multiple frequency channels. Generally both transmit and receive channels belong to the same frequency band. The unicast services are user specific and bi-directional.

In another scenario the base station provides only Multimedia Broadcast (MBMS) over single frequency networks (MBSFN), which generally uses unidirectional downlink channels. However, there can be multiple broadcast services, where each broadcast service is carried on a different frequency channel either within the same or a different frequency band.

In a hybrid service scenario, the base station can offer unicast and broadcast services on different frequency channels, which in turn may belong to the same or different frequency bands.

In the hybrid service scenario in E-UTRAN (Evolved UTRAN) it is required that the User Equipment (UE) is able to simultaneously receive frequency channels carrying unicast and broadcast services, as disclosed in 3GPP TR 25.913: "Requirements for Evolved UTRA (E-UTRA) and Evolved UTRAN (E-UTRAN)".

In some situations, the network requests the UE to perform handover to another frequency. Therefore, the UE must be made aware of the new frequency channels. For instance two frequency channels, one for transmission and the other for reception when it concerns a unicast service in FDD based systems.

When sending commands to UE to make the UE change operating frequency the unique number (ARFCN) is sent.

In the FDD mode the uplink frequency channel number can easily be derived from the ARFCN of the downlink frequency (or vice versa) since the ARFCN maps to an operating frequency band and an operating frequency. For each band the duplex distance, which is the allowed difference between uplink and downlink frequency, is fixed and a simple calculation then gives the uplink frequency.

For various reasons, e.g. varying channel allocations, different up and downlink bandwidths, there is a need to signal the uplink frequency to the mobile equipment as well, since for a certain downlink frequency there may be many possible uplink frequencies where only one should be used.

For instance in E-UTRAN FDD the duplex distance is not fixed. This means that the frequency channel number or the ARFCN used on the uplink cannot be uniquely derived by the UE from the downlink ARFCN signaled by the network or vice versa. In the state of the art technology, the network has to signal the entire ARFCN for both uplink and downlink. This will increase the signalling overheads by a factor of two since both uplink and downlink ARFCN are to be signaled. As an example, if 15 bits are used for signalling one ARFCN e.g. the downlink frequency channel then 15 bits would also be needed for signaling the uplink frequency channel.

There is also a requirement in E-UTRAN that it must be able to provide unicast and broadcast services on different carrier frequencies, which in turn should be simultaneously receivable by the UE. In such scenarios, in the current technology, the network will have to signal the ARFCN numbers of all the frequency channels the UE is supposed to receive. This will obviously lead to extra overhead.

SUMMARY

It is therefore an objective of the present invention to provide a solution for signaling to a UE, the frequency channels to be simultaneously receivable by the UE and/or the uplink frequency channels, in an efficient way that reduces overhead signaling.

In accordance with a first aspect of the present invention a method for numbering radio frequency channels to be used in a wireless communication system is provided. The available frequency spectrum associated with the wireless communication system is divided into frequency bands, wherein each frequency band comprises a plurality of frequencies. In the method, a global number to a primary frequency of a first band is assigned. The global number is unique among at least the first frequency band and the global number is indicative of at least a second frequency band associated with the first frequency band. An in-band number is further assigned to a secondary frequency within the at least the second frequency band.

In accordance with a second aspect of the present invention an arrangement for numbering radio frequency channels to be used in a wireless communication system is provided. The available frequency spectrum associated with the wireless communication system is divided into frequency bands, wherein each frequency band comprises a plurality of frequencies. The arrangement comprises means for assigning a global number to a primary frequency of a first band. The global number is unique among at least the first frequency band and the global number is indicative of at least a second frequency band associated with the first frequency band. The arrangement comprises further means for assigning an in-band number to a secondary frequency within the at least the second frequency band.

In accordance with further aspects of the present invention, a User Equipment and a Radio Base Station are provided comprising the above described arrangement for numbering radio frequency channels to be used in a wireless communication system.

According to embodiments of the invention the primary frequency is a downlink frequency and the secondary frequency is an uplink frequency. The primary frequency may also be a unicast frequency and the secondary frequency may be a MBSFN frequency.

An advantage with embodiments of the present invention is that the composite signaling of a primary (global) number and one or more secondary (in-band) numbers involves fewer bits compared to separate signaling of the entire ARFCN of all the frequency channels used.

A further advantage is that a particular technology can be deployed in several frequency bands. For instance UTRAN FDD can be deployed in up to ten different frequency bands. Furthermore, inclusion of new frequency bands is an on going process. Therefore, in practice the number of secondary frequencies that needs to be signaled in a band is much fewer than the number of global primary frequencies. For this reason, the number of bits required for signaling the secondary frequency is smaller, thereby reducing the signaling overhead.

BRIEF DESCRIPTION OF THE DRAWINGS

FIG. 3 illustrates a table listing of which frequency ranges that are used for the uplink and the downlink used for embodiments of the present invention.

DETAILED DESCRIPTION

In accordance with the present invention a composite channel numbering scheme comprising a primary and secondary channel numbering is introduced. The primary channel numbering is also referred to as global channel numbering and the secondary numbering is also referred to as in-band channel numbering. The channel numbers are assigned by the 3GPP and included in the standard specifications for the E-UTRA. Hence, the specifications for the E-UTRA, will according to the present invention include a table mapping the band and the frequency to the global channel number.

Figure 1:
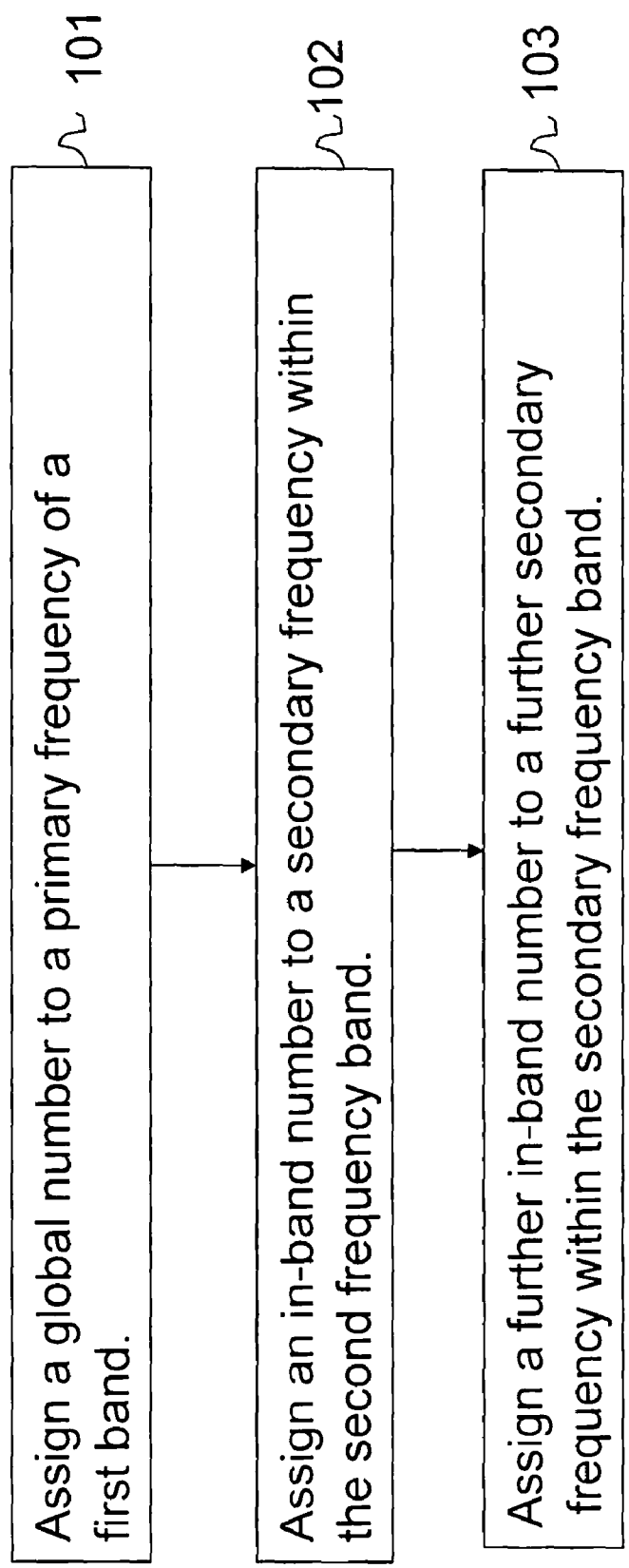
FIG. 1 is a flowchart illustrating a method according to an embodiment of the present invention.

Turning now to the flowchart of FIG. 1, the present invention relates to a method for numbering radio frequency channels to be used in a wireless communication system. The available frequency spectrum associated with the wireless communication system is divided into frequency bands, wherein each frequency band comprises a plurality of frequencies. The method comprises the steps of:

101. Assign a global number to a primary frequency of a first band, wherein the global number is unique among at least the first frequency band and the global number is indicative of at least a second frequency band associated with the first frequency band.

102. Assign an in-band number to a secondary frequency within the second frequency band.

In accordance with an embodiment of the present invention the method comprises at least a further step of:

103. Assign a further in-band number to a further secondary frequency within the secondary frequency band.

Figure 2:
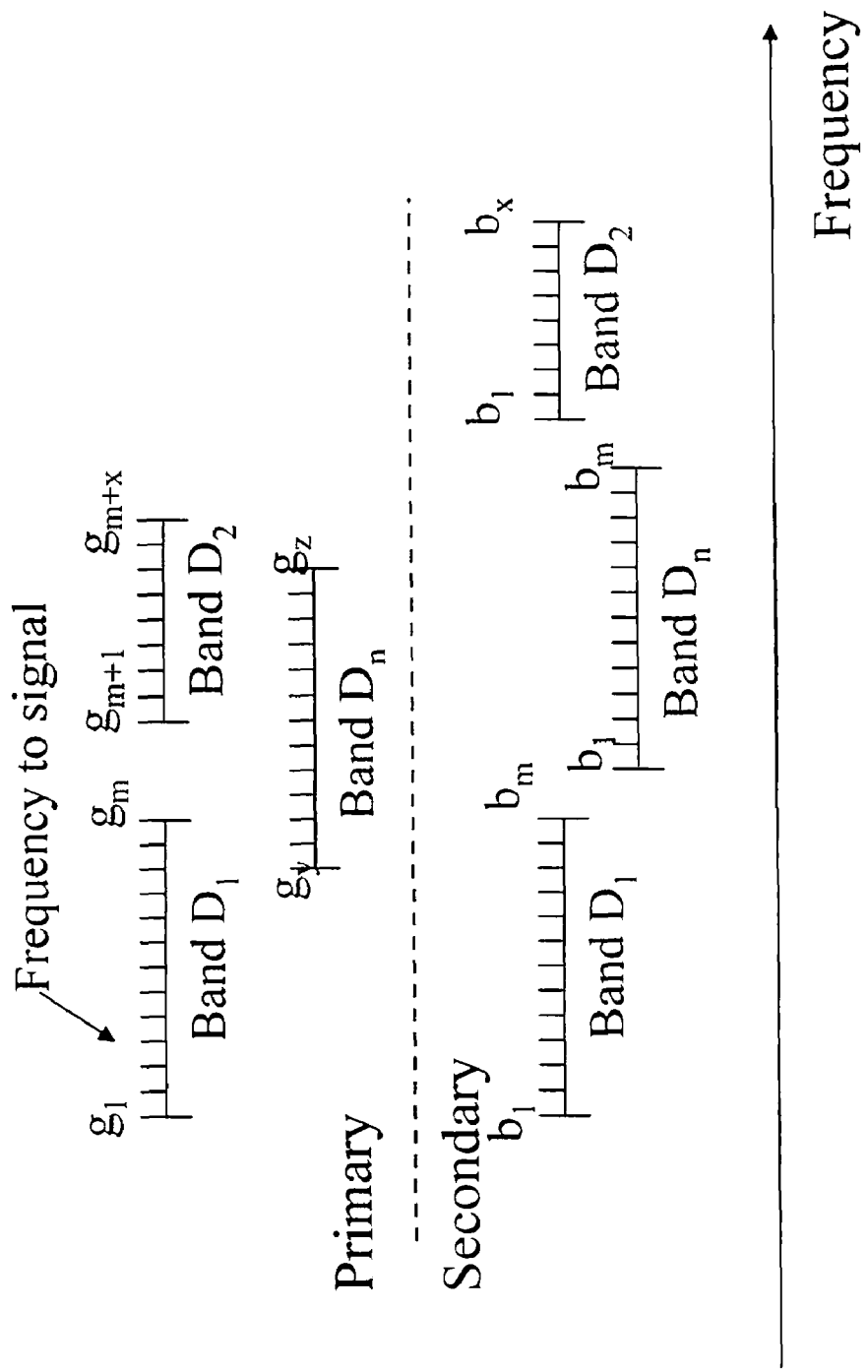
FIG. 2 illustrates the primary and the secondary numbering scheme according to an embodiment of the present invention.

As stated above, the primary frequency of each band is given a unique number, a global number, such that each global number enumerates exactly one frequency in one band as shown in FIG. 2. Thus the global number is a combination of band Dx and frequency gx. Note that since the bands may overlap, two global numbers may actually enumerate the same frequency, while the band number differs. In FIG. 2 the global numbers are sequentially assigned to the frequency channels across all the bands.

According to one alternative, the global numbering starts from zero. Another possibility is to start it from any arbitrary number. However, in terms of reducing signaling overheads it is more efficient to start from zero.

Another possibility is that the primary frequency for each channel is still unique in all the bands but it starts with any arbitrary value in each band. However, this will require more bits compared to the sequential number assignment as described below.

As illustrated in FIG. 2, the global numbers may be assigned sequentially. This can be further described by assuming that there are three bands denoted 1, 2, 3 wherein each band has 10 possible frequencies. Band 1 includes frequencies numbered 0-9, band 2 includes frequencies numbered 10-19, and band 3 includes frequencies numbered 20-29. Another possibility of consecutive but not sequential number assignment is that band 1 includes frequencies numbered 0-9, band 3 includes frequencies numbered 10-19 and band 2 includes frequencies numbered 20-29.

A yet further possibility is that band 1 includes frequencies numbered 0-9, band 2 includes frequencies numbered 45-54 and band 3 includes frequencies numbered 19-28.

Hence, the difference between the primary frequency and the ARFCN is that the global number associated with the primary frequency is just a number. In contrast, the ARFCN is the function that maps the number to frequency and band. For example the number 42 may be mapped to band 1 and to the carrier frequency 2134.6 MHz by the ARFCN function as explained above.

Moreover, the secondary frequency is signaled by using an in-band number where the number sequence is reused for each band as illustrated in FIG. 2. In FIG. 2, the secondary number is denoted bx. Thus the in-band number may signal different frequencies depending on the band already signaled by the global number for the primary frequency.

For each band there is a table listing as illustrated by FIG. 3 in the specification of which frequency ranges that are used for the uplink and the downlink. When the secondary number is signalled it is always indicated whether it concerns the downlink or uplink. Thus with the table from the specification, the implicit information about uplink and downlink, the band number from the primary number and the secondary number a frequency is uniquely pointed out. Therefore, the global number is indicative of the frequency band of the secondary frequency wherein the frequency band of the primary frequency and the frequency band of the secondary frequency are associated with each other. It should be noted that the table of FIG. 3 is only an example. Alternatively, the primary number could indicate the uplink frequency and the secondary number could indicate the downlink frequency. However it is most practical to let the primary number point to the downlink frequency.

According to one alternative, the secondary numbering may start from zero. Another possibility is to start the secondary numbering from the same arbitrary number in all the bands. However, in terms of reducing signalling overheads it is more efficient to start the second numbering from zero.

E-UTRAN can be deployed in large number of frequency bands (e.g. 10 or more). Independently of whether the bandwidth of the primary and secondary frequency channels (e.g. uplink and downlink bandwidths) is the same or different, the signaling of primary frequency or global number involves more overheads compared to the secondary frequency or in band number. Therefore, by using composite number signaling scheme, i.e. by signaling the combination of a global number and one or more in band numbers the overall signaling overhead will be reduced.

The downlink and uplink frequency channels may have different bandwidths (e.g. a wider downlink and narrower uplink) and an example of such an asymmetrical scenario comprises an MBSFN transmission on wider bandwidth in the downlink and UE feedback with a narrower channel in the uplink. Generally the same bandwidth is available for the downlink and uplink transmission in full duplex and half duplex modes. Typically, this implies that there will be fewer downlink channels compared to the number of uplink channels. More signalling overhead is required to cater for the large number of uplink channels available as compared to the downlink channels in this example. The signalling overhead is reduced if in-band numbers are assigned to the uplink channels and global numbers are assigned to the downlink channels. This is further explained by the following example. Assume a scenario with the following band sizes:

Band 1: 3 downlink (DL) channels and 10 uplink (UL) channels
Band 2: 4 downlink (DL) channels and 14 uplink (UL) channels
Band 3: 2 downlink (DL) channels and 5 uplink (UL) channels In this scenario, the assignment of global numbers to the downlink requires 9 (3+4+2) global numbers and 14 in-band numbers. The reverse case would be 29 (10+14+5) global numbers if used for the uplink and 4 for the downlink. From this scenario it can be seen that the amount of numbers needed is less in the first case (9+14) instead of 29+4.

Accordingly, the global and in-band numbers may correspond to downlink and uplink frequency channels respectively or vice versa. Similarly, global and in band numbers may also correspond to multiple frequency channels such as unicast and MBSFN within the same band.

According to one embodiment, the principle of signaling a primary and one or more secondary frequencies is used to signal uplink and downlink frequencies in E-UTRA FDD where the downlink is signaled as the primary frequency and the uplink is signaled as the secondary frequency. The same principle may also be used in systems that employ half duplex.

Moreover, the TDD unicast and MBSFN may be sent on different frequencies. Therefore, at least two frequency channels are to be signaled to the UE if it is able to receive them simultaneously. In this embodiment the composite numbering scheme may also be used for signaling the unicast frequency as the primary frequency and MBSFN frequency as the secondary frequency or vice versa.

In accordance with a further embodiment, the FDD or half duplex unicast and MBSFN are sent on different frequency channels and the UE may be required to simultaneously receive both services on the corresponding channels. In this scenario at least three frequency channels are needed: one downlink channel for unicast, one uplink channel for unicast and one downlink channel for MBSFN. Therefore, the numbering scheme according to the present invention may also be used by signaling for example one primary channel number corresponding to the downlink unicast channel, one secondary channel number corresponding to the uplink unicast and one secondary number corresponding to the MBSFN.

As explained above, there may be different bandwidths of downlink and uplink frequency channels. This type of scenario may comprise wide band downlink broadcast channel (e.g. MBSFN, Digital video broadcast-handset (DVB-H) etc) with one or more uplink narrow band feedback channel.

In such scenario the primary frequency numbering may also be used to signal a coarse frequency for one direction of a radio link and a secondary numbering for signaling the frequency with finer granularity for the link in the other direction. For example the primary frequency may be used to signal one of a few wideband downlink carriers and the secondary frequency may be used to designate one of many narrowband uplink carriers.

Figure 4:
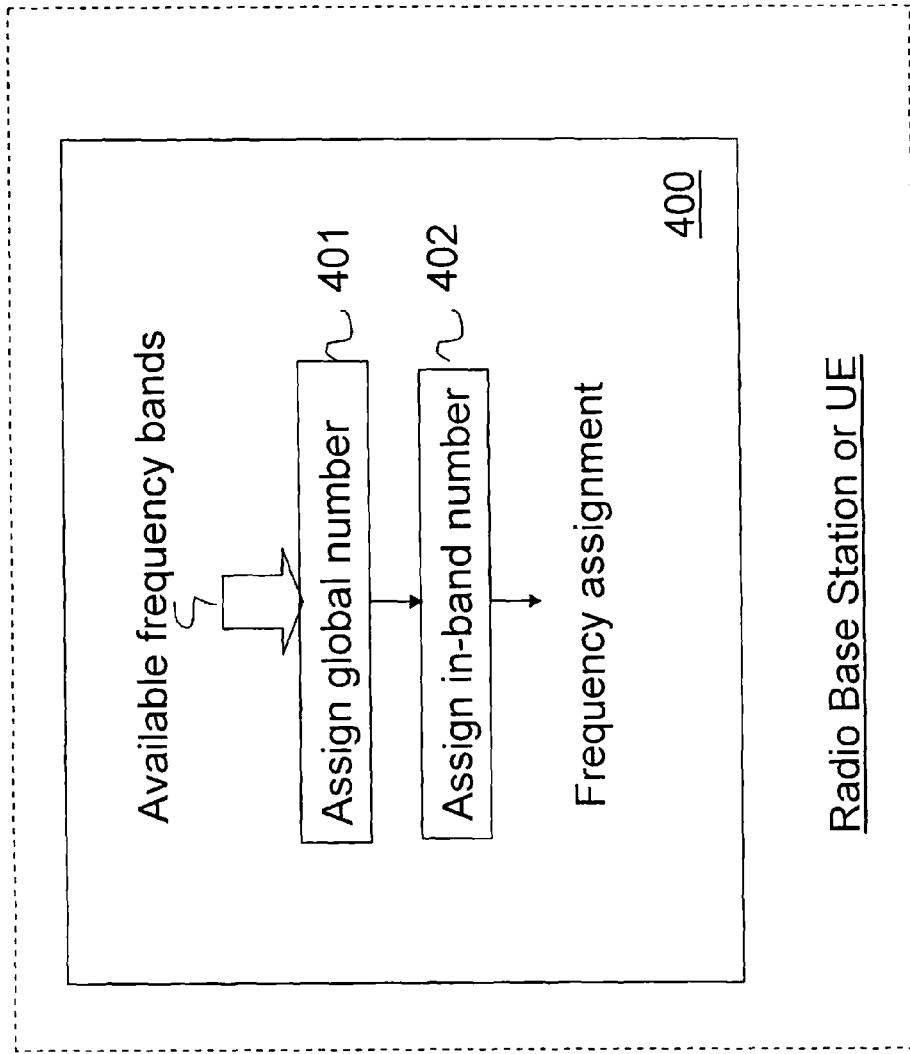
FIG. 4 illustrates an arrangement according to an embodiment of the present invention.

The method according to the embodiments of the present invention may be implemented in an arrangement 400 associated with a radio base station or a UE as illustrated in FIG. 4. As stated above, the actual frequency assignments are made by standardisation bodies, but both the radio base station and the UE needs to be aware of the specified assignments.

Accordingly, the arrangement 400 comprises means for assigning 401 a global number to a primary frequency of a first band based on knowledge of the available frequency bands. The global number is unique among at least the first frequency band and the global number is indicative of at least a second frequency band associated with the first frequency band. Furthermore, the arrangement 400 comprises means for assigning 402 an in-band number to a secondary frequency within the second frequency band. The means for assigning 402 an in-band number to a secondary frequency within the second frequency band may also be configured to assign a further in-band number to a further secondary frequency.

The present invention may be implemented as software in a computational unit in the base station and in the UE or as part of an ASIC (application specific integrated circuit) in the base station and in the UE.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means" may be represented by the same item of hardware or software.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for numbering radio frequency channels to be used in a wireless communication system, the available frequency spectrum associated with the wireless communication system is divided into frequency bands, wherein each frequency band comprises a plurality of frequencies, the method comprises the steps of:
- assigning a global number to a primary frequency of a first band, wherein the global number is unique among at least the first frequency band and the global number is indicative of at least a second frequency band associated with the first frequency band, and
- assigning an in-band number to a secondary frequency within the at least the second frequency band.

2. The method according to claim 1, wherein the primary frequency is a downlink frequency and the secondary frequency is an uplink frequency.

3. The method according to claim 1, wherein the primary frequency is a unicast frequency and the secondary frequency is a Multimedia Broadcast over single frequency networks (MBSFN) frequency.

4. The method according to claim 1, wherein the secondary frequency is a unicast frequency and the primary frequency is a Multimedia Broadcast over single frequency networks (MBSFN) frequency.

5. The method according to claim 1, wherein the secondary frequency is a frequency with a finer granularity than the primary frequency.

6. The method according to claim 1, wherein the method comprises the further step of:
- assigning a further in-band number to a further secondary frequency within the at least the second frequency band.

7. The method according to claim 6, wherein the primary frequency is a downlink unicast frequency and one of the secondary frequencies is an uplink unicast frequency and the other of the secondary frequencies is a Multimedia Broadcast over single frequency networks (MBSFN) frequency.

8. An arrangement for numbering radio frequency channels to be used in a wireless communication system, the available frequency spectrum associated with the wireless communication system is divided into frequency bands, wherein each frequency band comprises a plurality of frequencies, the arrangement comprises a computational circuit configured for assigning a global number to a primary frequency of a first band, wherein the global number is unique among at least the first frequency band and the global number is indicative of at least a second frequency band associated with the first frequency band, and for assigning an in-band number to a secondary frequency within the at least the second frequency band.

9. The arrangement according to claim 8, wherein the primary frequency is a downlink frequency and the secondary frequency is an uplink frequency.

10. The arrangement according to claim 8, wherein the primary frequency is a unicast frequency and the secondary frequency is a Multimedia Broadcast over single frequency networks (MBSFN) frequency.

11. The arrangement according to claim 8, wherein the secondary frequency is a unicast frequency and the primary frequency is a Multimedia Broadcast over single frequency networks (MBSFN) frequency.

12. The arrangement according to claim 8, wherein the secondary frequency is a frequency with a finer granularity than the primary frequency.

13. The arrangement according to claim 8, wherein the arrangement for assigning an in-band number is further configured to assign a further in-band number to a further secondary frequency within the at least the second frequency band.

14. The arrangement according to claim 13, wherein the primary frequency is a downlink unicast frequency and one of the secondary frequencies is an uplink unicast frequency and the other of the secondary frequencies is a Multimedia Broadcast over single frequency networks (MBSFN) frequency.

15. A Radio base station comprising an arrangement for numbering radio frequency channels to be used in a wireless communication system, the available frequency spectrum associated with the wireless communication system is divided into frequency bands, wherein each frequency band comprises a plurality of frequencies, and wherein the arrangement comprises a computational circuit configured for assigning a global number to a primary frequency of a first band, wherein the global number is unique among at least the first frequency band and the global number is indicative of at least a second frequency band associated with the first frequency band, and for assigning an in-band number to a secondary frequency within the at least the second frequency band.

16. A User equipment comprising an arrangement for numbering radio frequency channels to be used in a wireless communication system, the available frequency spectrum associated with the wireless communication system is divided into frequency bands, wherein each frequency band comprises a plurality of frequencies, the arrangement comprises a computational circuit configured for assigning a global number to a primary frequency of a first band, wherein the global number is unique among at least the first frequency band and the global number is indicative of at least a second frequency band associated with the first frequency band, and for assigning an in-band number to a secondary frequency within the at least the second frequency band.

* * * * *